(12) United States Patent
Washizu

(10) Patent No.: US 8,940,848 B2
(45) Date of Patent: Jan. 27, 2015

(54) BRANCHED CONJUGATED DIENE COPOLYMER, RUBBER COMPOSITION AND PNEUMATIC TIRE

(71) Applicant: Sumitomo Rubber Industries, Ltd., Kobe (JP)

(72) Inventor: Kensuke Washizu, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 14/017,382

(22) Filed: Sep. 4, 2013

(65) Prior Publication Data

US 2014/0100316 A1 Apr. 10, 2014

(30) Foreign Application Priority Data

Oct. 4, 2012 (JP) ................................. 2012-222454
Oct. 4, 2012 (JP) ................................. 2012-222457

(51) Int. Cl.

| *C08F 236/10* | (2006.01) |
| *C08F 236/16* | (2006.01) |
| *C08F 236/22* | (2006.01) |
| *C08L 9/06*   | (2006.01) |
| *C08L 19/00*  | (2006.01) |
| *B60C 1/00*   | (2006.01) |
| *C08F 12/08*  | (2006.01) |
| *C08F 212/08* | (2006.01) |
| *C08K 13/02*  | (2006.01) |
| *C08F 4/48*   | (2006.01) |

(52) U.S. Cl.
CPC . *C08F 12/08* (2013.01); *B60C 1/00* (2013.01); *C08F 212/08* (2013.01); *C08F 236/10* (2013.01); *C08F 236/22* (2013.01); *C08K 13/02* (2013.01); *B60C 1/0016* (2013.01); *Y10S 152/905* (2013.01)
USPC ........... 526/337; 526/284; 526/295; 526/336; 526/340; 525/237; 525/332.1; 525/332.8; 525/332.9; 152/450; 152/905

(58) Field of Classification Search
USPC ............... 526/295, 337, 340; 525/237, 332.9, 525/332.1, 332.8; 152/450, 905
See application file for complete search history.

(56) References Cited

U.S. PATENT DOCUMENTS

| 4,374,957 | A  |   | 2/1983  | Quirk |         |
|-----------|----|---|---------|-------|---------|
| 5,364,723 | A  |   | 11/1994 | Georges et al. | |
| 5,532,327 | A  | * | 7/1996  | Bayley et al. | ........... 526/180 |
| 7,868,114 | B1 | * | 1/2011  | McPhee | ........... 526/340.3 |
| 2010/0056714 | A1 | | 3/2010 | McPhee | |
| 2014/0100316 | A1 | | 4/2014 | Washizu | |

FOREIGN PATENT DOCUMENTS

| JP | 63-179908 | 7/1988 |
| JP | 5-125108 | 5/1993 |
| JP | 5-125225 | 5/1993 |
| JP | 6-313016 | 11/1994 |
| JP | 2013-231196 A | * 11/2013 |
| WO | 2010/027463 A1 | 3/2010 |
| WO | 2010/027464 A1 | 3/2010 |
| WO | WO 2013/128977 A1 | 9/2013 |
| WO | WO 2013/151067 A1 | 10/2013 |

OTHER PUBLICATIONS

Online translation of JP 2013-231196A; publication date: Nov. 14, 2013.*
Extended European Search Report issued Dec. 11, 2013 in Patent Application No. 13182916.0.
Sivola, "The n-butyllithium-initiated polymerization of myrcene and its copolymerization with styrene", Acta Polytechnica Scandinavica, Chemistry Including Metallurgy Series No. 134 (1977), 1-65 pp.
U.S. Appl. No. 14/368,407, filed Jun. 24, 2014, Washizu.
U.S. Appl. No. 14/370,323, filed Jul. 2, 2014, Washizu.
U.S. Appl. No. 14/378,193, filed Aug. 12, 2014, Washizu.
U.S. Appl. No. 14/378,186, filed Aug. 12, 2014, Washizu.

\* cited by examiner

*Primary Examiner* — Fred M Teskin
(74) *Attorney, Agent, or Firm* — Oblon, Spivak, McClelland, Maier & Neustadt, L.L.P.

(57) ABSTRACT

The present invention relates to a branched conjugated diene copolymer which is useful for preparing a rubber composition, having high uniformity of a temperature dependence curve of a viscoelasticity tan δ, for a tire, a rubber composition comprising the copolymer, and a pneumatic tire produced using the rubber composition for a tire. The branched conjugated diene copolymer is composed of monomer components comprising a branched conjugated diene compound represented by a general formula (1):

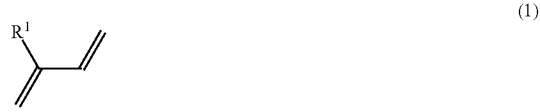

(1)

wherein $R^1$ represents an aliphatic hydrocarbon group having 6 to 11 carbon atoms, and an aromatic vinyl compound represented by a general formula (2):

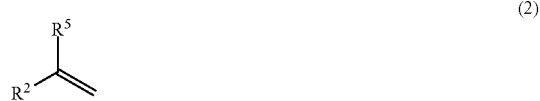

(2)

wherein $R^2$ represents an aromatic hydrocarbon group having 6 to 10 carbon atoms, and $R^5$ represents a hydrogen atom or the like, and a copolymerization ratio (m) of the aromatic vinyl compound (2) is 45% by mass or more.

21 Claims, 2 Drawing Sheets

BRANCHED CONJUGATED DIENE COPOLYMER, RUBBER COMPOSITION AND PNEUMATIC TIRE

TECHNICAL FIELD

The present invention relates to a branched conjugated diene copolymer, a rubber composition comprising the copolymer, and a pneumatic tire produced using the rubber composition.

BACKGROUND OF THE INVENTION

A high grip performance is demanded for tires as a basic property. It is generally known, as a method for improving a grip performance of tires, to blend in a rubber composition for a tire a rubber having a high glass transition temperature (Tg) (for example, one having Tg of −25° C. or more) or carbon black having a large surface area. In order to make a glass transition temperature high, for example, there is a method of increasing a styrene content in a polymer. However, when a copolymerization ratio of an aromatic vinyl compound such as styrene becomes as high as 45% by mass or more or when a molecular weight (Mw) of a polymer becomes as high as more than 500000, there is a problem, for example, that a styrene chain distribution in a polymer increases, and a temperature dependence curve (a curve obtained by plotting tan δ values at each temperature when the temperature is changed) of a viscoelasticity tan δ of a rubber composition for a tire prepared using such a polymer shows multiple peaks.

For vehicles, especially general cars such as passenger cars, low fuel consumption, namely improvement in rolling resistance is demanded from environmental point of view in addition to a grip performance, in particular a wet grip performance as a basic performance. A viscoelasticity tan δ of a rubber composition is an index for such wet grip performance and low fuel consumption. Namely, a tan δ at 0° C. is an index for wet grip performance, and the higher the tan δ is, the better a braking efficiency is. A tan δ at 60° C. is an index for rolling resistance, and the lower the tan δ is, the better the fuel consumption is.

In addition, for vehicles for racing, a high grip performance is demanded as a basic performance. A viscoelasticity tan δ of a rubber composition is an index for such grip performance. Namely, a tan δ in a temperature range of from 20° to 100° C., particularly from 30° to 45° C., is an index for grip performance within such a temperature range, and the higher the tan δ is, the better a braking efficiency is.

Therefore, if a temperature dependence curve of tan δ can be controlled so that its shape becomes as uniform as possible without multiple peaks, it is possible to provide a rubber composition for a tire exhibiting intended desired characteristics (for example, a rubber composition for a tire having improved grip performance within a specific temperature range, or the like). Therefore, in the development of a polymer for a tire rubber, control of a temperature dependence curve of tan δ is an important issue to be addressed.

SUMMARY OF THE INVENTION

It is an object of the present invention to provide a branched conjugated diene copolymer which is useful for preparing a rubber composition, having high uniformity of a temperature dependence curve of a viscoelasticity tan δ, for a tire, a rubber composition comprising the copolymer, and a pneumatic tire produced using the rubber composition for a tire.

The inventors of the present invention have made intensive studies in order to solve the above-mentioned problem and as a result, have found that by using a specific branched conjugated diene copolymer as a rubber component, in which a copolymerization ratio of the aromatic vinyl compound is as high as 45% by mass or more based on the whole monomers and a specific branched conjugated diene monomer is contained as a part of monomer components constituting the copolymer, uniformity of a temperature dependence curve of a viscoelasticity tan δ of the obtained rubber composition can be enhanced even if the copolymerization ratio of the aromatic vinyl compound is high. Thus, further studies have been made and the present invention has been completed.

Namely, the present invention relates to a branched conjugated diene copolymer composed of monomer components comprising a branched conjugated diene compound represented by a general formula (1):

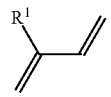

(1)

wherein $R^1$ represents an aliphatic hydrocarbon group having 6 to 11 carbon atoms, and an aromatic vinyl compound represented by a general formula (2):

(2)

wherein $R^2$ represents an aromatic hydrocarbon group having 6 to 10 carbon atoms, and $R^5$ represents a hydrogen atom or an alkyl group having 1 to 3 carbon atoms,
wherein a copolymerization ratio (m) of the aromatic vinyl compound (2) is 45% by mass or more.

It is preferable that a glass transition temperature of the above-mentioned branched conjugated diene copolymer is −25° C. or more.

It is preferable that a glass transition temperature of the above-mentioned branched conjugated diene copolymer is −10° C. or more.

It is preferable that a weight-average molecular weight of the above-mentioned branched conjugated diene copolymer is more than 100000.

It is preferable that the above-mentioned monomer components further comprise a conjugated diene compound represented by a general formula (3):

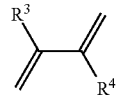

(3)

wherein $R^3$ and $R^4$ are the same or different, and each represents a hydrogen atom, an aliphatic hydrocarbon group having 1 to 3 carbon atoms, or a halogen atom.

It is preferable that in the above-mentioned branched conjugated diene copolymer, a copolymerization ratio (1) of the branched conjugated diene compound (1) is from 1 to 54% by mass, a copolymerization ratio (m) of the aromatic vinyl compound (2) is from 45 to 99% by mass, and a copolymerization ratio (n) of the conjugated diene compound (3) is from 0 to 54% by mass.

It is preferable that the branched conjugated diene compound (1) is myrcene and/or farnesene.

It is preferable that the aromatic vinyl compound (2) is one or more selected from the group consisting of styrene, α-methylstyrene, α-vinylnaphthalene and β-vinylnaphthalene.

It is preferable that the above-mentioned conjugated diene compound (3) is 1,3-butadiene and/or isoprene.

Further, the present invention relates to a rubber composition comprising the above-mentioned branched conjugated diene copolymer as a rubber component, in which a half width at half maximum of a viscoelasticity tan δ defined by the following equation is 40 or less.

Half width at half maximum=(Higher temperature at half height of tan δ peak)−(Tanδ peak temperature)

Furthermore, the present invention relates to a pneumatic tire produced using the above-mentioned rubber composition.

According to the present invention, by using a specific branched conjugated diene monomer as a part of monomer components constituting the copolymer, uniformity of a temperature dependence curve of a viscoelasticity tan δ of the rubber composition prepared using the copolymer can be enhanced even if the copolymerization ratio of the aromatic vinyl compound monomer is as high as 45% by mass or more. By using such a copolymer, it is possible to provide a rubber composition for a tire exhibiting a desired performance, for example, a rubber composition for a tire having improved wet grip performance and fuel consumption performance or a rubber composition for a tire (for example, a rubber composition for a tire for racing cars) having improved grip performance within a specific temperature range (for example, within a specific temperature range of from 20° to 100° C., preferably from 30° to 45° C.).

DETAILED DESCRIPTION

As mentioned above, the first aspect of the present invention relates to the branched conjugated diene copolymer which can enhance uniformity of a temperature dependence curve of a viscoelasticity tan δ.

Figure 1:
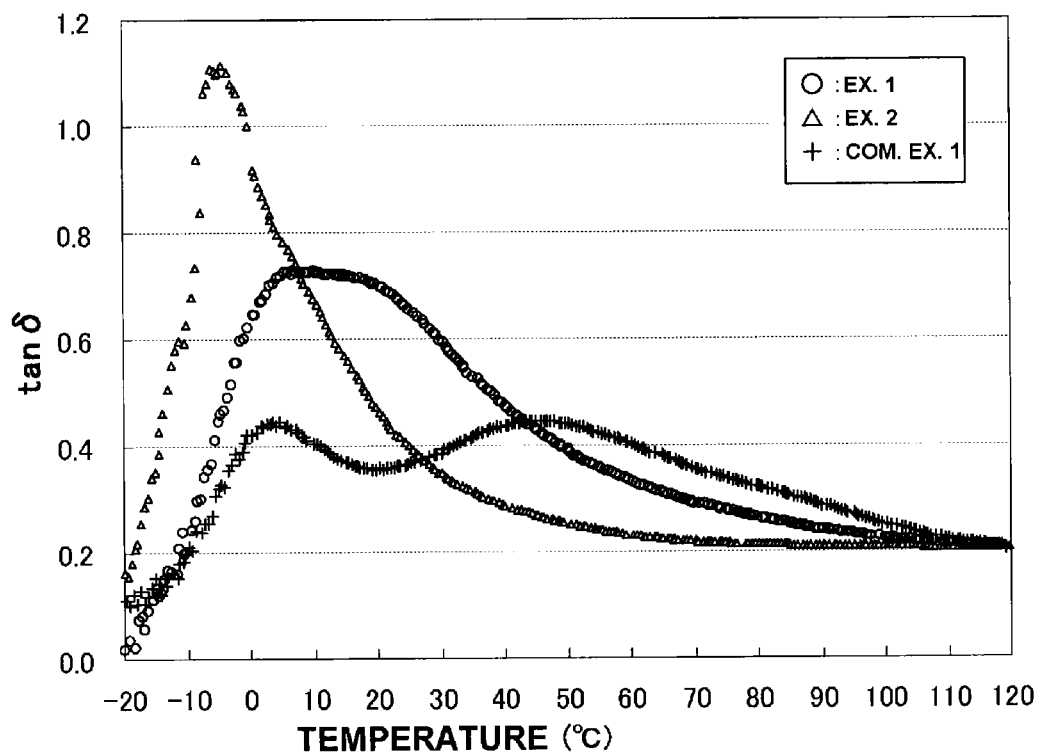
FIG. 1 is a graph showing temperature dependence curves of a viscoelasticity tan δ of vulcanized rubber compositions 1 to 3 (Example 1, Example 2 and Comparative Example 1).

The second aspect relates to the branched conjugated diene copolymer which can enhance uniformity of a temperature dependence curve of a viscoelasticity tan δ as shown representatively in FIG. 1 and can improve wet grip performance and fuel efficiency by utilizing the enhanced uniformity.

Figure 2:
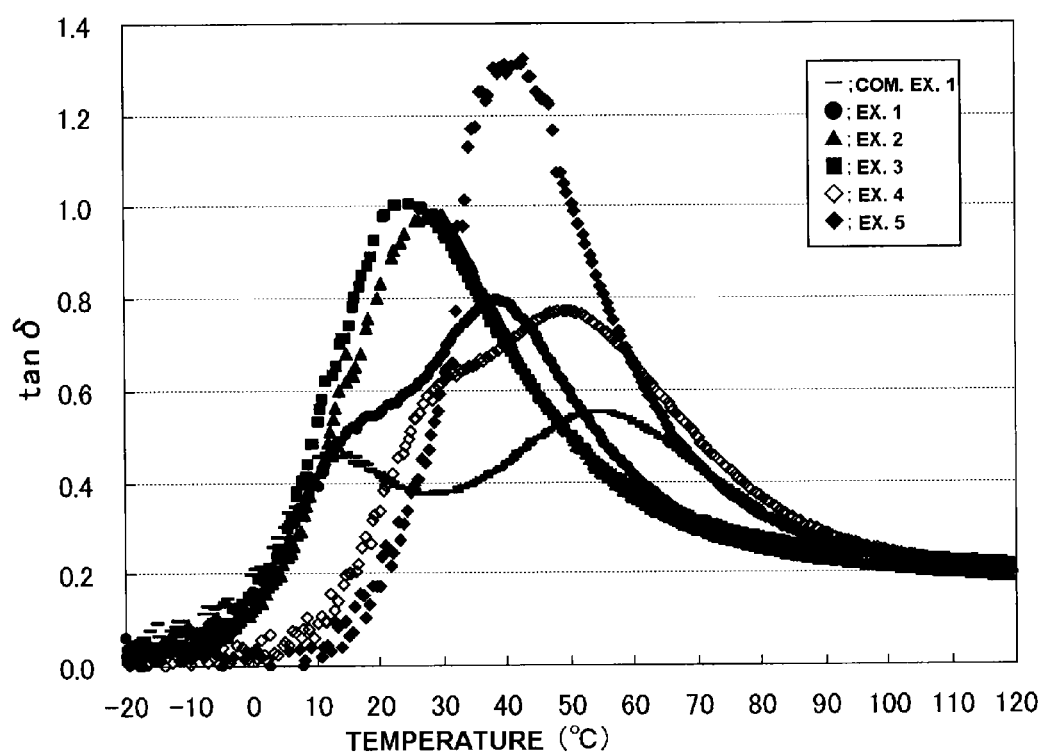
FIG. 2 is a graph showing temperature dependence curves of a viscoelasticity tan δ of vulcanized rubber compositions 4 to 9 (Examples 3 to 7 and Comparative Example 2).

The third aspect relates to the branched conjugated diene copolymer which can enhance uniformity of a temperature dependence curve of a viscoelasticity tan δ as shown representatively in FIG. 2 and can improve grip performance within a specific temperature range (for example, within a specific temperature range of from 20° to 100° C., preferably from 30° to 45° C.).

The branched conjugated diene copolymer of the present invention is one composed of the monomer components comprising the branched conjugated diene compound (1) and at least 45% by mass of the aromatic vinyl compound (2) or one composed of the monomer components further comprising the conjugated diene compound (3).

(Copolymer)

The copolymerization ratios of the branched conjugated diene compound (1), the aromatic vinyl compound (2) and the conjugated diene compound (3) as monomers in the branched conjugated diene copolymer of the present invention are explained below.

The copolymerization ratio (1) of the branched conjugated diene compound (1) is not limited particularly as long as it is from 1 to 55% by mass. The copolymerization ratio is preferably 2% by mass or more, more preferably 2.5% by mass or more, further preferably 5% by mass or more. If the copolymerization ratio is less than 1% by mass, there is a tendency that a sufficient effect for improvement to eliminate multiple peaks in the viscoelasticity tan δ curve cannot be obtained. The copolymerization ratio is preferably 20% by mass or less, more preferably 15% by mass or less. This is because when the compound is blended in a copolymerization ratio of as much as 20% by mass, there is a tendency that a sufficient effect resulting from the blending of the branched conjugated diene compound (1) can be obtained.

The copolymerization ratio (n) of the aromatic vinyl compound (2) is not limited particularly as long as it is from 45 to 99% by mass. The copolymerization ratio is preferably 46% by mass or more, more preferably 47% by mass or more, more preferably 48% by mass or more, more preferably 49% by mass or more, further preferably 50% by mass or more. If the copolymerization ratio is less than 45% by mass, there is a tendency that such a copolymerization ratio is not an extent causing a problem with multiple peaks in the viscoelasticity tan δ curve, and an effect of copolymerizing the branched conjugated diene compound (1) for improvement to eliminate multiple peaks is decreased. The copolymerization ratio is preferably 70% by mass or less, more preferably 60% by mass or less. If the copolymerization ratio is more than 70% by mass, there is a concern such that the tan δ (60° C.) becomes high and sufficient fuel consumption performance is not obtained.

The copolymerization ratio (m) of the conjugated diene compound (3) is not limited particularly as long as it is from 0 to 54% by mass. The copolymerization ratio is preferably 2% by mass or more, more preferably 5% by mass or more, and is preferably 50% by mass or less, more preferably 45% by mass or less.

With respect to the above-mentioned copolymerization ratios, in the case of the branched conjugated diene copolymer of the present invention comprising only the compounds (1) and (2), when the copolymerization ratio of one of them is determined within the above-mentioned range, the copolymerization ratio of another compound is also determined accordingly. In the case of the branched conjugated diene copolymer of the present invention comprising only the compounds (1) to (3), when the copolymerization ratios of any two compounds are determined within the above-mentioned ranges, the copolymerization ratio of the remaining compound is also determined accordingly.

<Branched Conjugated Diene Compound>

In the branched conjugated diene compound (1), examples of the aliphatic hydrocarbon group having 6 to 11 carbon atoms are those having a normal structure such as hexyl, heptyl, octyl, nonyl, decyl and undecyl, isomers and/or unsaturated groups thereof, and derivatives thereof (for example, halides, hydroxides, and the like). Preferred examples are 4-methyl-3-pentenyl group, 4,8-dimethyl-nona-3,7-dienyl group, and the like, and derivatives thereof.

Examples of the branched conjugated diene compound (1) are myrcene, farnesene, and the like.

In particular, β-myrcene (7-methyl-3-methyleneocta-1,6-diene) having the following structure is preferred as myrcene.

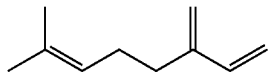
(4)

In particular, (E)-β-farnesene (7,11-dimethyl-3-methylene-1,6,10-dodecatriene) having the following structure is preferred as farnesene.

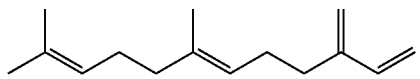
(5)

The branched conjugated diene compounds (1) can be used alone or can be used in combination of two or more thereof.

<Aromatic Vinyl Compound>

In the aromatic vinyl compound (2), examples of the aromatic hydrocarbon group having 6 to 10 carbon atoms are phenyl, benzyl, phenethyl, tolyl, xylyl, naphthyl, and the like. The substitution position of methyl on the benzene ring of tolyl includes any of ortho, meta and para positions, and the substitution position of methyl in xylyl also includes any of optional substitution positions. Among these groups, preferred are phenyl, tolyl and naphthyl. Examples of the alkyl group having 1 to 3 carbon atoms are methyl, ethyl, n-propyl and isopropyl, and among these, methyl is preferred.

Examples of the preferred aromatic vinyl compound (2) are styrene, α-methylstyrene, α-vinylnaphthalene and β-vinylnaphthalene.

The aromatic vinyl compounds (2) can be used alone or can be used in combination of two or more thereof.

<Conjugated Diene Compound>

In the conjugated diene compound (3), examples of the aliphatic hydrocarbon group having 1 to 3 carbon atoms are methyl, ethyl, n-propyl, isopropyl, and the like, and among these, methyl is preferred. Examples of the halogen atom are fluorine, chlorine, bromine and iodine, and among these, chlorine is preferred.

Examples of the conjugated diene compound (3) are 1,3-butadiene, isoprene, 2,3-dimethyl-1,3-butadiene, and the like, and among these, 1,3-butadiene and isoprene are preferred.

The conjugated diene compounds (3) can be used alone or can be used in combination of two or more thereof.

<Glass Transition Temperature>

The glass transition temperature (Tg) of the branched conjugated diene copolymer of the present invention is preferably −25° C. or more. If it is less than −25° C., there is a tendency that sufficient grip performance cannot be obtained. Tg is preferably 35° C. or less. When Tg exceeds 35° C., there is a tendency that the rubber composition become brittle and processability is lowered.

In the second aspect of the present invention, it is necessary to make the tan δ (0° C.) high for obtaining sufficient wet grip performance. In this case, Tg is preferably −25° C. or more, more preferably −20° C. or more. When Tg is less than −25° C., there is a tendency that the tan δ (0° C.) decreases and sufficient wet grip performance cannot be obtained. Tg is preferably 15° C. or less, more preferably 10° C. or less. When Tg is more than 15° C., there is a tendency that the tan δ (60° C.) becomes high and sufficient fuel consumption performance is not obtained. Therefore, since the branched conjugated diene copolymer having Tg of from −25° C. to 15° C. exhibits sufficient wet grip performance and low fuel consumption, it is suitable as a rubber component for a tire for general vehicles (for example, passenger cars (PC) and trucks and buses (TB)).

In the third aspect of the present invention, for exhibiting sufficient grip performance within a specific temperature range between 20° C. and 100° C., preferably 30° and 45° C., Tg is preferably −10° C. or more, more preferably −5° C. or more. When Tg is less than −10° C., there is a tendency that sufficient grip performance cannot be obtained. Tg is preferably 35° C. or less, more preferably 25° C. or less. When Tg exceeds 35° C., there is a tendency that the rubber composition become brittle and processability is lowered. Therefore, since the branched conjugated diene copolymer of the present invention exhibits sufficient grip performance, it is suitable for uses as a rubber component for a tire for racing cars.

Tg of the branched conjugated diene copolymer tends to become lower as the amount of the contained conjugated diene compound (3), for example, high-cis butadiene prepared using a transition-metal catalyst is increased, and tends to become higher as the amount of the contained aromatic vinyl compound (2) such as styrene prepared using an anionic polymerization catalyst is increased.

In addition, Tg can be adjusted by an amount of a polar compound to be used for preparing the branched conjugated diene copolymer. Namely, when the amount of polar compound is increased, there is a tendency that the amount of vinyl in a butadiene structure increases and, accordingly, Tg increases, and when the amount of polar compound is decreased, there is a tendency that the amount of vinyl in a butadiene structure decreases and, accordingly, Tg decreases.

<Half Width at Half Maximum of Viscoelasticity tan δ>

In the present invention, the half width at half maximum of a viscoelasticity tan δ is a value obtained based on a peak shape of the temperature dependence curve of a viscoelasticity tan δ of the rubber composition, and concretely is obtained by the following equation.

Half width at half maximum=(Higher temperature at half height of tan δ peak)−(Tanδ peak temperature)

Here, the temperature dependence curve of a viscoelasticity tan δ is "a curve obtained by plotting tan δ values of the rubber composition at each temperature when the temperature is changed". In the present invention, the tan δ is a value measured at a dynamic strain amplitude of 1% at a frequency of 10 Hz using a spectrometer (Model: VES-F1112 available from Ueshima Seisakusho Co., Ltd.).

In the present invention, the half width at half maximum of viscoelasticity tan δ is not more than 40, preferably not more than 30, more preferably not more than 20. When the half width at half maximum exceeds 40, there is a tendency that the peak height of the tan δ decreases and sufficient grip performance cannot be obtained.

In addition, from the viewpoint of sufficient wet grip performance and fuel consumption performance, the half width at half maximum of viscoelasticity tan δ is not more than 40, preferably not more than 30, more preferably not more than 20. When the half width at half maximum exceeds 40, there is a tendency that a balance between the wet grip performance and the fuel consumption performance is lowered and performance of a tire is not achieved sufficiently.

The half width at half maximum generally has a correlation with the uniformity of a temperature dependence curve of a viscoelasticity tan δ, and it is known that the smaller the half width at half maximum is, the higher the uniformity of the curve is. Here, "uniformity" means that the curve shows a single peak (a concept as opposed to multiple peaks), which means that the tan δ peak becomes relatively higher. Therefore, by controlling the half width at half maximum so as to make it smaller, the uniformity of a temperature dependence curve of a viscoelasticity tan δ can be increased and the tan δ peak can be made high, thereby making it possible to provide a rubber composition having desired characteristics, for example, a rubber composition having improved wet grip performance and fuel consumption performance or a rubber composition having improved grip performance, especially grip performance within a specific temperature range of from 20° C. to 100° C., preferably from 30° to 45° C.

<Tanδ>

A tan δ value is an index for grip performance, etc.

In the second aspect of the present invention, for example, tan δ at 0° C. (tan δ (0° C.)) is an index for wet grip performance, and a larger tan δ value is regarded as good for braking property. The value is preferably 0.4 or more, further preferably 0.6 or more. When it is less than 0.4, there is a tendency that sufficient wet grip performance cannot be obtained. An upper limit of tan δ (0° C.) is not restricted particularly. Tanδ at 60° C. (tan δ (60° C.)) is an index for rolling resistance, and a smaller tan δ value is regarded as good for giving good fuel consumption performance. The tan δ (60° C.) value is preferably 0.4 or less, further preferably 0.35 or less. When it is more than 0.4, there is a tendency that sufficient fuel efficiency is not achieved.

In the third aspect of the present invention, a larger tan δ value within the above-mentioned specific temperature range of from 20° C. to 100° C., preferably from 30° to 45° C. is good for good braking property. The tan δ value is preferably 0.5 or more, further preferably 0.6 or more. When it is less than 0.5, there is a tendency that sufficient grip performance cannot be obtained. An upper limit of the tan δ is not limited particularly.

In the present invention, the peak value of tan δ is not limited particularly, and is preferably 0.4 or more, further preferably 0.5 or more. When it is less than 0.4, there is a tendency that sufficient grip performance at each temperature cannot be attained. An upper limit of the peak value of tan δ is not restricted particularly.

<Molecular Weight>

The weight-average molecular weight (Mw) of the branched conjugated diene copolymer of the present invention is not limited particularly as long as it is 100000 or more. The weight-average molecular weight is preferably 500000 or more. When Mw is less than 100000, there is a tendency that the polymer is in a liquid form having no rubber elasticity. Mw is preferably 3000000 or less. When Mw exceeds 3000000, there is a tendency that the polymer is in a solid form having no rubber elasticity.

In the branched conjugated diene copolymer, a ratio of Mw to a number-average molecular weight (Mn), namely Mw/Mn is preferably 10.0 or less, more preferably 5.0 or less. When the Mw/Mn exceeds 10.0, there is a tendency that the polymer becomes a softened product having no rubber elasticity. A lower limit of the Mw/Mn is not limited particularly, and when it is 1.0 or more, no problem arises.

<Mooney Viscosity>

A Mooney viscosity $ML_{1+4}$ (130° C.) of the branched conjugated diene copolymer of the present invention is generally preferably 25 or more, more preferably 30 or more. When the Mooney viscosity is less than 25, the copolymer tends to have fluidity. The Mooney viscosity is preferably 160 or less, more preferably 150 or less, further preferably 100 or less, further preferably 60 or less. When the Mooney viscosity exceeds 160, there is a tendency that large amounts of a softening agent and processing aid are necessary at the time of processing.

The Mooney viscosity $ML_{1+4}$ (130° C.) of the branched conjugated diene copolymer of the present invention is characterized by being lower as compared with that of a copolymer which is obtained by replacing the branched conjugated diene compound (1) constituting the copolymer with the conjugated diene compound (3) and has the same molecular weight. Therefore, the branched conjugated diene copolymer is useful for improving processability when preparing the rubber composition.

<Preparation Method>

The branched conjugated diene copolymer of the present invention can be obtained by copolymerizing the branched conjugated diene compound (1), the aromatic vinyl compound (2), and if desired, the conjugated diene compound (3).

In such a copolymerization process, an order of copolymerization of monomers is not limited particularly. For example, all monomers may be subjected to random copolymerization simultaneously, or after previously copolymerizing specific monomer or monomers (for example, only the branched conjugated diene compound (1), only the aromatic vinyl compound (2), only the conjugated diene compound (3) or two kinds of monomers arbitrarily selected from these), the remaining monomers or monomer may be added and copolymerized, or each monomer may be previously copolymerized respectively, and then subjected to block copolymerization.

Such copolymerization can be carried out by a usual method, for example, by anionic polymerization reaction, coordination polymerization reaction, or the like.

A polymerization method is not limited particularly, and any of a solution polymerization method, an emulsion polymerization method, a gas phase polymerization method and a bulk polymerization method can be used. Among these, a solution polymerization method is preferred. The polymerization may be carried out batchwise or continuously.

<Anionic Polymerization>

Anionic polymerization can be carried out in a proper solvent in the presence of an anionic initiator. As an anionic initiator, any of usual ones can be used suitably, and examples of such an anionic initiator are organolithium compounds having a general formula RLix (R is an aliphatic, aromatic or alicyclic group having one or more carbon atoms, x is an integer of 1 to 20). Examples of proper organolithium compounds are methyllithium, ethyllithium, n-butyllithium, sec-butyllithium, tert-butyllithium, phenyllithium and naphthyllithium. Preferred organolithium compounds are sec-butyllithium and tert-butyllithium. Anionic initiators can be used alone or can be used in a mixture of two or more thereof. An amount of a polymerization initiator for anionic polymerization is not limited particularly, and it is preferable to use, for example, in an amount of preferably from about 0.05 mmol to 35 mmol, more preferably from about 0.05 mmol to 0.2 mmol per 100 g of all monomers to be subjected to polymerization.

As a solvent to be used for the anionic polymerization, any of solvents can be used suitably as long as they neither inactivate the anionic initiator nor stop the polymerization reaction, and any of polar solvents and nonpolar solvents can be used. Examples of polar solvents are ether solvents such as tetrahydrofuran, and examples of nonpolar solvents are chain hydrocarbons such as hexane, heptane, octane and pentane, cyclic hydrocarbons such as cyclohexane, aromatic hydrocarbons such as benzene, toluene and xylene, and the like. These solvents can be used alone or can be used in a mixture of two or more thereof.

It is further preferable to carry out the anionic polymerization in the presence of a polar compound. Examples of polar compounds are dimethyl ether, diethyl ether, ethyl methyl ether, ethyl propyl ether, tetrahydrofuran, dioxane, diphenyl ether, tripropylamine, tributylamine, trimethylamine, triethylamine, N,N,N',N'-tetramethylethylenediamine (TMEDA), and the like. Polar compounds can be used alone or can be used in a mixture of two or more thereof. The polar compound is useful for reducing the content of 1,2-structure in the micro structure of butadiene portion. The amount of polar compound varies depending on kind thereof and the polymerization conditions, and a molar ratio thereof to the anionic initiator (polar compound/anionic initiator) is preferably 0.1 or more. When the molar ratio of the polar compound to the anionic initiator (polar compound/anionic initiator) is less than 0.1, there is a tendency that an effect of using the polar compound for controlling the micro structure is not sufficient.

The reaction temperature of the anionic polymerization is not limited particularly as long as the reaction advances properly, and usually is preferably from −10° to 100° C., more preferably from 25° to 70° C. In addition, the reaction time varies depending on charging amounts, reaction temperature and other conditions, and usually, for example, about 3 hours is sufficient.

The above-mentioned anionic polymerization can be terminated by adding a reaction inhibitor to be usually used in this field. Examples of the reaction inhibitor are polar solvents having an active proton such as alcohols, for example, methanol, ethanol and isopropanol or acetic acid, a mixture thereof, or a mixture of the polar solvents with nonpolar solvents such as hexane and cyclohexane. A sufficient amount of reaction inhibitor is usually an equimolar amount or two-fold molar amount with the anionic initiator.

After the polymerization reaction, the branched conjugated diene copolymer can be separated from the polymerization solution easily by removing the solvent by a usual method or by pouring the polymerization solution in an alcohol of an amount equal to or more than the amount of polymerization solution and precipitating the branched conjugated diene copolymer.

<Coordination Polymerization>

The coordination polymerization can be carried out using a coordination polymerization initiator instead of the anionic initiator in the anionic polymerization. Any of usual coordination polymerization initiators can be suitably used, and examples thereof are catalysts that are transition metal-containing compounds such as lanthanoid compounds, titanium compounds, cobalt compounds and nickel compounds. In addition, if desired, an aluminum compound or a boron compound can be used as a co-catalyst.

The lanthanoid compound is not limited particularly as long as it contains any of elements (lanthanoids) of atomic numbers 57 to 71, and among these lanthanoids, neodymium is preferred particularly. Examples of the lanthanoid compounds are carboxylates, β-diketone complexes, alkoxides, phosphates, phosphites, halides and the like of these elements. Among these, from the viewpoint of easy handling, carboxylates, alkoxides, and β-diketone complexes are preferred. Examples of the titanium compounds are titanium-containing compounds having a cyclopentadienyl group, an indenyl group, a substituted cyclopentadienyl group, or a substituted indenyl group and also having 1 to 3 substituents selected from halogen, an alkoxysilyl group and an alkyl group, and preferred are compounds having one alkoxysilyl group from the viewpoint of catalytic activity. Examples of the cobalt compounds are halides, carboxylates, β-diketone complexes, organic base complexes, organic phosphine complexes, and the like of cobalt. Examples of the nickel compounds are halides, carboxylates, β-diketone complexes, organic base complexes, and the like of nickel. Catalysts to be used as a coordination polymerization initiator can be used alone or can be used in combination of two or more thereof. An amount of a catalyst to be used as a polymerization initiator for the coordination polymerization is not limited particularly, and for example, a preferred amount thereof is the same as the amount of the catalyst for the anionic polymerization.

Examples of the aluminum compounds to be used as a co-catalyst are organic aluminoxanes, halogenated organoaluminum compounds, organoaluminum compounds, hydrogenated organoaluminum compounds, and the like. Examples of the organic aluminoxanes are alkyl aluminoxanes (such as methyl aluminoxane, ethyl aluminoxane, propyl aluminoxane, butyl aluminoxane, isobutyl aluminoxane, octyl aluminoxane, and hexyl aluminoxane); examples of the halogenated organoaluminum compounds are halogenated alkyl aluminum compounds (such as dimethyl aluminum chloride, diethyl aluminum chloride, methyl aluminum dichloride, and ethyl aluminum dichloride); examples of the organoaluminum compounds are alkyl aluminum compounds (such as trimethylaluminum, triethylaluminum, triisopropylaluminum, and triisobutylaluminum); and examples of the hydrogenated organoaluminum compounds are hydrogenated alkyl aluminum compounds (such as diethylaluminum hydride, and diisobutylaluminum hydride). Examples of the boron compounds are compounds having anion species such as tetraphenylborate, tetrakis(pentafluorophenyl)borate, and (3,5-bistrifluoromethylphenyl)borate. These co-catalysts can also be used alone or can be used in combination of two or more thereof.

In the coordination polymerization, the solvents and the polar compounds explained in the anionic polymerization can be used similarly. In addition, the reaction time and the reaction temperature are the same as those explained in the anionic polymerization. Termination of the polymerization reaction and separation of the branched conjugated diene copolymer can also be carried out in the same manner as in the anionic polymerization.

The weight-average molecular weight (Mw) of the branched conjugated diene copolymer can be controlled by adjusting the amounts of branched conjugated diene and other monomers to be charged at the polymerization. For example, by increasing the ratio of all monomers to the anionic polymerization catalyst, Mw can be increased, and by decreasing the ratio, Mw can be decreased. The same is true also for the number-average molecular weight (Mn) of the branched conjugated diene copolymer.

Tg of the branched conjugated diene copolymer can be controlled by adjusting the amount of aromatic vinyl compound (2) to be charged at the polymerization. For example, by increasing the copolymerization ratio of aromatic vinyl compound (2), Tg can be made high, and on the contrary, by decreasing the copolymerization ratio of aromatic vinyl compound (2), Tg can be made low.

The Mooney viscosity of the branched conjugated diene copolymer can be controlled by adjusting the amount of branched conjugated diene monomer (1) to be charged at the polymerization. For example, by decreasing the amount of branched conjugated diene compound (1), the Mooney viscosity is increased, and on the contrary, by increasing the amount, the Mooney viscosity is decreased.

(Rubber Composition)

By blending other components which are usually used in the field of rubber industry with the thus obtained branched conjugated diene copolymer of the present invention, a rubber composition for a tire can be prepared.

Examples of the components to be blended in the rubber composition of the present invention are rubber components other than the branched conjugated diene copolymer, a filler, a silane coupling agent, and the like.

In the rubber composition for a tire of the present invention, the amount of the branched conjugated diene copolymer in the rubber components is about 10% by mass or more, preferably 20% by mass or more. When the amount of the branched conjugated diene copolymer is less than 10% by mass, there is a tendency that the effect on the viscoelasticity tan δ curve of the rubber composition by blending the branched conjugated diene copolymer is decreased. Meanwhile, an upper limit of the amount of the branched conjugated diene copolymer is not limited particularly.

In the present invention, examples of the rubber components to be used together with the branched conjugated diene copolymer are diene rubbers such as a natural rubber (NR), an isoprene rubber (IR), a butadiene rubber (BR), a styrene-butadiene rubber (SBR), a styrene-isoprene rubber (SIR), a styrene-isoprene-butadiene rubber (SIBR), an ethylene propylene diene rubber (EPDM), a chloroprene rubber (CR), an acrylonitrile-butadiene rubber (NBR), a butyl rubber (IIR), and the like. These diene rubbers may be used alone or may be used in combination of two or more thereof. Among these, it is preferable to use NR, BR, or SBR for the reason that a well-balanced grip performance and abrasion resistance can be obtained in combination use with the branched conjugated diene copolymer, and it is more preferable to use NR. NR is not limited particularly, and those commonly used for production of tires can be used. Examples thereof are SIR20, RSS#3, TSR20, and the like.

Examples of the filler are carbon black, silica, and the like which are commonly used in this field.

Carbon blacks which are used generally in production of tires can be used, and examples thereof are SAF, ISAF, HAF, FF, FEF, GPF, and the like. These carbon blacks can be used alone or can be used in combination of two or more thereof. The nitrogen adsorption specific surface area ($N_2SA$) of carbon black is not less than about 80 $m^2/g$, preferably not less than about 110 $m^2/g$. When $N_2SA$ is less than 80 $m^2/g$, both of grip performance and abrasion resistance tend to be lowered. When $N_2SA$ is less than 110 $m^2/g$, an effect of using the branched conjugated diene copolymer for improving processability tends to be decreased. $N_2SA$ of carbon black is not more than about 270 $m^2/g$, preferably not more than about 260 $m^2/g$. When $N_2SA$ of carbon black is more than 270 $m^2/g$, dispersibility of carbon black tends to be decreased. $N_2SA$ of carbon black is determined according to A method of JIS K 6217.

A blending amount of carbon black is not less than about 1 part by mass, preferably not less than about 3 parts by mass based on 100 parts by mass of the rubber components. When the blending amount of carbon black is less than 1 part by mass, abrasion resistance tends to be lowered. The blending amount of carbon black is not more than about 200 parts by mass, more preferably not more than 150 parts by mass. When the blending amount of carbon black exceeds 200 parts by mass, processability tends to be lowered.

As silica, for example, silica (silicic anhydride) prepared by a dry method and silica (hydrous silicate) prepared by a wet method are exemplified. Among these, silica prepared by a wet method is preferred for the reason that there are many surface silanol groups and many reaction points with a silane coupling agent. $N_2SA$ of silica is not less than about 50 $m^2/g$, preferably not less than about 80 $m^2/g$. When $N_2SA$ is less than 50 $m^2/g$, there is a tendency that a reinforcing effect is small and abrasion resistance is decreased. $N_2SA$ of silica is not more than about 300 $m^2/g$, preferably not more than about 250 $m^2/g$. When $N_2SA$ is more than 300 $m^2/g$, there is a tendency that dispersibility of silica is decreased and processability is lowered. $N_2SA$ of silica is determined by BET method according to ASTM D3037-93.

A blending amount of silica is not less than about 1 part by mass, preferably not less than about 10 parts by mass based on 100 parts by mass of the rubber components. When the blending amount of silica is less than 1 part by mass, there is a tendency that abrasion resistance is not sufficient. The blending amount of silica is not more than about 150 parts by mass, more preferably not more than 100 parts by mass. When the blending amount of carbon black exceeds 150 parts by mass, there is a tendency that dispersibility of silica is decreased and processability is lowered.

It is preferable that the rubber composition comprises a silane coupling agent. As the silane coupling agent, a silane coupling agent which has been well-known can be used. Examples thereof are sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl) aminopropyltrimethoxysilane; glycidoxysilane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane, and the like. These silane coupling agents can be used alone, or can be used in combination of two or more thereof. From the viewpoint of good processability, it is preferable that among these, bis(3-triethoxysilylpropyl)tetrasulfide or bis(3-triethoxysilylpropyl)disulfide is contained in the rubber composition.

When the silane coupling agent is contained, the blending amount thereof is preferably not less than 1 part by mass, more preferably not less than 2 parts by mass based on 100 parts by mass of silica. When the amount of silane coupling agent is less than 1 part by mass, there is a tendency that a sufficient improving effect of dispersibility cannot be obtained. The amount of silane coupling agent is preferably not more than 20 parts by mass, more preferably not more than 15 parts by mass. When the amount of silane coupling agent exceeds 20 parts by mass, there is a tendency that a sufficient coupling effect cannot be obtained and a reinforcing property is decreased.

In addition to the above-mentioned components, compounding agents which have been used in the field of rubber industry, for example, an other reinforcing filler, an antioxidant, an oil, a wax, a vulcanizing agent such as sulfur, a vulcanization accelerator, a vulcanization aid, and the like can be properly blended to the rubber composition of the present invention.

The thus obtained rubber composition of the present invention can be used as various parts for tires, for example, can be suitably used especially for a tire tread since wet grip performance and low fuel consumption can be improved to a high level and grip performance within a specific temperature range can be improved.

(Pneumatic Tire)

The rubber composition of the present invention can be used for production of tires and can be formed into tires by a usual method. Namely, a mixture obtained by optionally blending the above-mentioned components according to necessity is subjected to kneading, extrusion processing to a shape of each part of a tire at an unvulcanized stage, and molding on a tire molding machine by a usual method, thus forming an unvulcanized tire. A tire can be obtained by heating and compressing this unvulcanized tire in a vulcanizer, and by introducing air in the tire, a pneumatic tire can be obtained.

Herein, Mw and Mn are measured using a gel permeation chromatograph (GPC), and are converted based on standard polystyrene.

A glass transition temperature (Tg) is measured with a differential scanning calorimeter (DSC).

A Mooney viscosity is measured in accordance with JIS K 6300.

A range simply indicated by, for example, "1 to 99% by mass" is construed so as to include the figures at both ends.

EXAMPLE

The present invention is explained by means of Examples, but is not limited to the Examples.

Various chemicals used for synthesis of diene copolymers and preparation of rubber compositions in Examples and Comparative Examples are collectively shown below. The various chemicals were subjected to purification according to necessity by a usual method.

<Various Chemicals Used for Synthesis of Copolymers>

Cyclohexane: Cyclohexane available from Kanto Chemical Industry Co., Ltd.

Isopropanol: Isopropanol available from Kanto Chemical Industry Co., Ltd.

Branched conjugated diene compound: β-Myrcene available from Wako Pure Chemical Industries, Ltd.

Aromatic vinyl compound: Styrene available from Wako Pure Chemical Industries, Ltd.

Conjugated diene compound: 1,3-Butadiene available from Takachiho Chemical Industrial Co., Ltd.

Polar compound: Tetrahydrofuran (THF) available from Wako Pure Chemical Industries, Ltd.

<Various Chemicals Used for Preparation of Rubber Composition>

Copolymer: Those synthesized in accordance with the description of this specification Carbon black: DIABLACK A (N110, Nitrogen adsorption specific surface area ($N_2SA$): 130 $m^2/g$) available from Cabot Corporation Oil: PROCESS X-260 available from JX Nippon Oil & Energy Corporation Stearic acid: Stearic acid available from NOF CORPORATION Zinc oxide: Zinc White Grade 2 available from Mitsui Mining & Smelting Co., Ltd.

Sulfur: Powdered sulfur available from Tsurumi Chemical Industry Co., Ltd.

Vulcanization accelerator: NOCCELER NS (N-tert-butyl-2-benzothiazolylsulfenamide) available from Ouchi Shinko Chemical Industrial Co., Ltd.

Examples 1 and 2 and Comparative Example 1

Example 1

(1) (Synthesis of Copolymer 1)

Into a 3-liter pressure resistant stainless steel vessel having been subjected to drying and replacement with nitrogen, 1500 ml of cyclohexane, 10 g of myrcene, 50 g of styrene, 40 g of butadiene and 3 ml of THF were poured, and further, 0.4 mmol of n-butyllithium (n-BuLi) was added thereto, followed by 3-hour polymerization reaction at 40° C. After three hours had elapsed, 0.44 ml of 1M isopropanol/hexane solution was added dropwise to terminate the reaction. The obtained polymerization solution was subjected to blast drying to remove the solvent, followed by drying under reduced pressure at an inner pressure of 0.1 kPa or less at a temperature of 50° C. until a constant weight is reached. Thus, 100 g (dry mass) of Copolymer 1 was obtained. The degree of polymerization (percentage of dry mass/charged amount) was nearly 100%.

(2) (Preparation of Unvulcanized Rubber Composition 1)

The Copolymer 1 obtained above and the above-mentioned various chemicals for preparation of a rubber composition (except insoluble sulfur and vulcanization accelerator) were kneaded at 150° C. for five minutes in a Banbury mixer in accordance with the formulation shown in Table 2, and a kneaded product was obtained. Sulfur and vulcanization accelerator were added to the kneaded product, followed by 12-minute kneading at 170° C. using an open roll to obtain Unvulcanized Rubber Composition 1.

(3) (Preparation of Vulcanized Rubber Composition 1)

The Unvulcanized Rubber Composition 1 obtained in (2) above was subjected to 20-minute press-vulcanization at 170° C. to obtain Vulcanized Rubber Composition 1.

Example 2

(1) (Synthesis of Copolymer 2)

Processing was carried out in the same manner as in (1) of Example 1 except that the amounts of myrcene and butadiene were changed to 20 g and 30 g, respectively, to obtain 100 g of Copolymer 2. The degree of polymerization was nearly 100%.

(2) (Preparation of Unvulcanized Rubber Composition 2)

Processing was carried out in the same manner as in (2) of Example 1 except that Copolymer 2 was used instead of Copolymer 1, to obtain Unvulcanized Rubber Composition 2.

(3) (Preparation of Vulcanized Rubber Composition 2)

Unvulcanized Rubber Composition 2 obtained in (2) above was subjected to processing in the same manner as in (3) of Example 1 to obtain Vulcanized Rubber Composition 2.

Comparative Example 1

(1) (Synthesis of Copolymer 3)

Processing was carried out in the same manner as in (1) of Example 1 except that 50 g of styrene and 50 g of butadiene were used instead of using 10 g of myrcene, 50 g of styrene, and 40 g of butadiene, to obtain 100 g of Copolymer 3. The degree of polymerization was nearly 100%.

(2) (Preparation of Unvulcanized Rubber Composition 3)

Processing was carried out in the same manner as in (2) of Example 1 except that Copolymer 3 was used instead of Copolymer 1, to obtain Unvulcanized Rubber Composition 3.

(3) (Preparation of Vulcanized Rubber Composition 3)

Unvulcanized Rubber Composition 3 obtained in (2) above was subjected to processing in the same manner as in (3) of Example 1 to obtain Vulcanized Rubber Composition 3.

With respect to the obtained Copolymers 1 to 3, the following tests were carried out. The results are shown in Table 1.

(Measurement of Micro Structure (Vinyl Amount (mol %), Styrene Amount (mass %)))

The micro structure was measured with an apparatus ADVANCE II Series available from BRUKER BIOSPIN K.K.

(Measurement of Weight-Average Molecular Weight (Mw), Number-Average Molecular Weight (Mn))

Mw and Mn were measured with an apparatus GPC-8000 Series available from TOSO CORPORATION and a differential refractometer as a detector, and were converted based on standard polystyrene.

(Measurement of Glass Transition Temperature (Tg))

Measurement was carried out using a differential scanning calorimeter (apparatus DSC Q200 Series available from TA Instruments, Japan) at a heat-up rate of 10° C./min from an initial temperature of −150° C. to a final temperature of 150° C. to calculate Tg.

TABLE 1

|  | Example | | Com. Ex. |
| --- | --- | --- | --- |
|  | 1 | 2 | 1 |
| Copolymer | 1 | 2 | 3 |
| Charging amount | | | |
| Branched conjugated diene compound (% by mass) | 10 | 20 | 0 |
| Aromatic vinyl compound (% by mass) | 50 | 50 | 50 |
| Conjugated diene compound (% by mass) | 40 | 30 | 50 |
| Polar compound (ml) | 3 | 3 | 3 |
| Results | | | |
| Yield (%) | 100 | 100 | 100 |
| Vinyl amount (mol %) | 33 | 34 | 32 |
| Styrene amount (% by mass) | 48 | 47 | 46 |

TABLE 1-continued

|  | Example | | Com. Ex. |
| --- | --- | --- | --- |
|  | 1 | 2 | 1 |
| Number-average molecular weight (Mn) | 600000 | 610000 | 600000 |
| Weight-average molecular weight (Mw) | 660000 | 670000 | 670000 |
| Molecular weight distribution (Mw/Mn) | 1.1 | 1.1 | 1.1 |
| Glass transition temperature (Tg) | −23° C. | −24° C. | −26° C. |

The following tests were carried out using the obtained Vulcanized Rubber Compositions 1 to 3 or using Test Tires 1 to 3 with a tread portion formed from Unvulcanized Rubber Compositions 1 to 3 (size: 195/65R15, vulcanization conditions: 170° C., 20 min). The results are shown in Table 2.

(Half Width at Half Maximum of Viscoelasticity tan δ)

A change in tan δ value of the Vulcanized Rubber Compositions 1 to 3 relative to a temperature change was measured at a dynamic strain amplitude of 1% at a frequency of 10 Hz using a spectrometer (Model: VES-F1112 available from Ueshima Seisakusho Co., Ltd.). The results are shown in FIG. 1. From FIG. 1, half widths at half maximum of viscoelasticity tan δ of Examples and Comparative Example were obtained.

(Rolling Resistance)

Test Tires 1 to 3 were run using a rim (15×6JJ) at an inner pressure of 230 kPa at a load of 3.43 kN at a speed of 80 km/h, and rolling resistances thereof were measured with a rolling resistance tester. The rolling resistance is indicated by an index on the assumption that the rolling resistance of Comparative Example 1 is 100. The smaller the index is, the better the rolling resistance is.

(Wet Grip Performance)

A vehicle equipped with Test Tires 1 to 3 (rim: 15×6JJ, inner pressure: 230 kPa) were run on a wet asphalt road at an initial speed of 100 km/h, and a braking distance was measured. The results are indicated by an index shown by the following equation. The larger the figure is, the better the wet skid performance (wet grip performance) is. The index was obtained by the following equation.

Wet skid performance=(Braking distance of Comparative Example 1)÷(Braking distance of each Example or each Comparative Example)

(Tire Balance)

A tire balance was evaluated by a driver using the vehicle used in the above-mentioned evaluation of wet grip performance, and the results are represented by an index obtained in accordance with on the following criteria. The larger the figure is, the better the tire balance is. Namely, the tire balance was evaluated using the following ten items under the condition that a maximum evaluation point of each item is 20 and the point of Comparative Example 1 is 10. Therefore, the maximum evaluation point is 200, and the total point of Comparative Example 1 is 100.

(1) Response near N
(2) Response at steering
(3) Grip level at turning
(4) Grip level at lane change
(5) Vehicle stability at outlet of curve
(6) Delay in follow-up action for yawing
(7) Linearity of yawing
(8) Yaw gain
(9) Self-straightening property
(10) Steering stability against rough road surface (Processability)

A test piece of a given size was prepared from the above unvulcanized rubber composition, and a Mooney viscosity $ML_{1+10}$ (130° C.) thereof was measured using a Mooney viscosity tester in accordance with JIS K 6300 "Test Method of Unvulcanized Rubber". The test piece was pre-heated to 130° C. for one minute and under this temperature condition, a large rotor was rotated and after a lapse of ten minutes, the Mooney viscosity $ML_{1+10}$ (130° C.) was measured. The smaller the Mooney viscosity is, the better the processability is.

TABLE 2

|  | Example | | Com. Ex. |
| --- | --- | --- | --- |
|  | 1 | 2 | 1 |
| Blending amount (part by mass) | | | |
| Copolymer 1 | 100 | | |
| Copolymer 2 | | 100 | |
| Copolymer 3 | | | 100 |
| Carbon black | 50 | 50 | 50 |
| Oil | 30 | 30 | 30 |
| Stearic acid | 2 | 2 | 2 |
| Zinc oxide | 1.4 | 1.4 | 1.4 |
| Sulfur | 2 | 2 | 2 |
| Vulcanization accelerator | 2 | 2 | 2 |
| Results of evaluation | | | |
| Half width at half maximum of tanδ | 40 | 11 | 81 |
| Peak height of tanδ | 0.72 | 1.11 | 0.44 |
| Tanδ (0° C.) | 0.65 | 1.00 | 0.42 |
| Tanδ (60° C.) | 0.34 | 0.23 | 0.40 |
| Rolling resistance | 81 | 56 | 100 |
| Wet grip performance | 150 | 250 | 100 |
| Tire balance | 165 | 182 | 100 |
| Processability (Mooney viscosity) | 48.2 | 45.0 | 53.5 |

Examples 3 to 7 and Comparative Example 2

Example 3

(1) (Synthesis of Copolymer 4)

Into a 3-liter pressure resistant stainless steel vessel having been subjected to drying and replacement with nitrogen, 1500 ml of cyclohexane, 10 g of myrcene, 50 g of styrene, 40 g of butadiene and 30 ml of THF were poured, and further, 0.4 mmol of n-butyllithium (n-BuLi) was added thereto, followed by 3-hour polymerization reaction at 40° C. After three hours had elapsed, 0.44 ml of 1M isopropanol/hexane solution was added dropwise to terminate the reaction. The obtained polymerization solution was subjected to blast drying to remove the solvent, followed by drying under reduced pressure at an inner pressure of 0.1 kPa or less at a temperature of 50° C. until a constant weight is reached. Thus, 100 g (dry mass) of Copolymer 4 was obtained. The degree of polymerization (percentage of dry mass/charged amount) was nearly 100%.

(2) (Preparation of Unvulcanized Rubber Composition 4)

The obtained Copolymer 4 and the above-mentioned various chemicals for preparation of a rubber composition (except insoluble sulfur and vulcanization accelerator) were kneaded at 150° C. for five minutes in a Banbury mixer in accordance with the formulation shown in Table 4, and a kneaded product was obtained. Sulfur and vulcanization accelerator were added to the kneaded product, followed by 12-minute kneading at 170° C. using an open roll to obtain Unvulcanized Rubber Composition 4.

(3) (Preparation of Vulcanized Rubber Composition 4)

The Unvulcanized Rubber Composition 4 obtained in (2) above was subjected to 20-minute press-vulcanization at 170° C. to obtain Vulcanized Rubber Composition 4.

Example 4

(1) (Synthesis of Copolymer 5)

Processing was carried out in the same manner as in (1) of Example 3 except that the amounts of myrcene and butadiene were changed to 20 g and 30 g, respectively, to obtain 100 g of Copolymer 5. The degree of polymerization was nearly 100%.

(2) (Preparation of Unvulcanized Rubber Composition 5)

Processing was carried out in the same manner as in (2) of Example 3 except that Copolymer 5 was used instead of Copolymer 4, to obtain Unvulcanized Rubber Composition 5.

(3) (Preparation of Vulcanized Rubber Composition 5)

Unvulcanized Rubber Composition obtained in (2) above was subjected to processing in the same manner as in (3) of Example 3 to obtain Vulcanized Rubber Composition 5.

Example 5

(1) (Synthesis of Copolymer 6)

Processing was carried out in the same manner as in (1) of Example 3 except that the amounts of myrcene and butadiene were changed to 30 g and 20 g, respectively, to obtain 100 g of Copolymer 6. The degree of polymerization was nearly 100%.

(2) (Preparation of Unvulcanized Rubber Composition 6)

Processing was carried out in the same manner as in (2) of Example 3 except that Copolymer 6 was used instead of Copolymer 4, to obtain Unvulcanized Rubber Composition 6.

(3) (Preparation of Vulcanized Rubber Composition 6)

Unvulcanized Rubber Composition obtained in (2) above was subjected to processing in the same manner as in (3) of Example 3 to obtain Vulcanized Rubber Composition 6.

Example 6

(1) (Synthesis of Copolymer 7)

Processing was carried out in the same manner as in (1) of Example 3 except that the amounts of myrcene, styrene, and butadiene were changed to 10 g, 60 g, and 30 g, respectively, to obtain 100 g of Copolymer 7. The degree of polymerization was nearly 100%.

(2) (Preparation of Unvulcanized Rubber Composition 7)

Processing was carried out in the same manner as in (2) of Example 3 except that Copolymer 7 was used instead of Copolymer 4, to obtain Unvulcanized Rubber Composition 7.

(3) (Preparation of Vulcanized Rubber Composition 7)

Unvulcanized Rubber Composition obtained in (2) above was subjected to processing in the same manner as in (3) of Example 3 to obtain Vulcanized Rubber Composition 7.

Example 7

(1) (Synthesis of Copolymer 8)

Processing was carried out in the same manner as in (1) of Example 3 except that the amounts of myrcene, styrene, and butadiene were changed to 20 g, 60 g, and 20 g, respectively, to obtain 100 g of Copolymer 8. The degree of polymerization was nearly 100%.

(2) (Preparation of Unvulcanized Rubber Composition 8)

Processing was carried out in the same manner as in (2) of Example 3 except that Copolymer 8 was used instead of Copolymer 4, to obtain Unvulcanized Rubber Composition 8.

(3) (Preparation of Vulcanized Rubber Composition 8)

Unvulcanized Rubber Composition obtained in (2) above was subjected to processing in the same manner as in (3) of Example 3 to obtain Vulcanized Rubber Composition 8.

Comparative Example 2

(1) (Synthesis of Copolymer 9)

Processing was carried out in the same manner as in (1) of Example 3 except that 50 g of styrene and 50 g of butadiene were used instead of 10 g of myrcene, 50 g of styrene, and 40 g of butadiene, to obtain 100 g of Copolymer 9. The degree of polymerization was nearly 100%.

(2) (Preparation of Unvulcanized Rubber Composition 9)

Processing was carried out in the same manner as in (2) of Example 3 except that Copolymer 9 was used instead of Copolymer 4, to obtain Unvulcanized Rubber Composition 9.

(3) (Preparation of Vulcanized Rubber Composition 9)

Unvulcanized Rubber Composition obtained in (2) above was subjected to processing in the same manner as in (3) of Example 3 to obtain Vulcanized Rubber Composition 9.

The same tests as mentioned supra were carried out using the obtained Copolymers 4 to 9. The results are shown in Table 3.

TABLE 3

| | Example | | | | | Com. Ex. |
|---|---|---|---|---|---|---|
| | 3 | 4 | 5 | 6 | 7 | 2 |
| Copolymer | 4 | 5 | 6 | 7 | 8 | 9 |
| Charging amount | | | | | | |
| Branched conjugated diene compound (% by mass) | 10 | 20 | 30 | 10 | 20 | 0 |
| Aromatic vinyl compound (% by mass) | 50 | 50 | 50 | 60 | 60 | 50 |
| Conjugated diene compound (% by mass) | 40 | 30 | 20 | 30 | 20 | 50 |
| Polar compound (ml) | 30 | 30 | 30 | 30 | 30 | 30 |
| Results | | | | | | |
| Yield (%) | 100 | 100 | 100 | 100 | 100 | 100 |
| Vinyl amount (mol %) | 53 | 53 | 55 | 54 | 53 | 52 |
| Styrene amount (mass %) | 48 | 49 | 46 | 61 | 62 | 46 |
| Number-average molecular weight (Mn) | 620000 | 620000 | 630000 | 660000 | 650000 | 600000 |
| Weight-average molecular weight (Mw) | 680000 | 680000 | 690000 | 730000 | 720000 | 660000 |
| Molecular weight distribution (Mw/Mn) | 1.1 | 1.1 | 1.1 | 1.1 | 1.1 | 1.1 |
| Glass transition temperature (Tg) | −7° C. | −5° C. | −8° C. | −5° C. | −7° C. | −10° C. |

The following tests were carried out using the obtained Unvulcanized Rubber Compositions 4 to 9 and Vulcanized Rubber Compositions 4 to 9. The results are shown in Table 4. In addition, the test for processability was carried out in the same manner as mentioned supra.

(Half Width at Half Maximum of Viscoelasticity tan δ)

A change in tan δ value of the Vulcanized Rubber Compositions 4 to 9 relative to a temperature change was measured at a dynamic strain amplitude of 1% at a frequency of 10 Hz using a spectrometer (Model: VES-F1112 available from Ueshima Seisakusho Co., Ltd.). The results are shown in FIG. 2. From FIG. 2, half widths at half maximum of viscoelasticity tan δ of Examples and Comparative Example were obtained.

(Grip Performance)

Tires (size: 195/65R15, vulcanization conditions: 170° C., 20 min) having a tread produced using the above-mentioned rubber compositions were produced, and an in-vehicle running test was carried out on an asphalt circuit course using the produced tires (rim: 15×6JJ, inner pressure: 230 kPa). A test driver evaluated stability of steering control, and the stability is indicated by FIGS. 1 to 5 on the assumption that the stability of Comparative Example 2 is 1. The larger the figure is, the higher and the more excellent the grip performance is.

TABLE 4

| | Example | | | | | Com. Ex. |
|---|---|---|---|---|---|---|
| | 3 | 4 | 5 | 6 | 7 | 2 |
| Blending amount (part by mass) | | | | | | |
| Copolymer 4 | 100 | | | | | |
| Copolymer 5 | | 100 | | | | |
| Copolymer 6 | | | 100 | | | |
| Copolymer 7 | | | | 100 | | |
| Copolymer 8 | | | | | 100 | |
| Copolymer 9 | | | | | | 100 |

TABLE 4-continued

| | Example | | | | | Com. Ex. |
|---|---|---|---|---|---|---|
| | 3 | 4 | 5 | 6 | 7 | 2 |
| Carbon black | 50 | 50 | 50 | 50 | 50 | 50 |
| Oil | 30 | 30 | 30 | 30 | 30 | 30 |
| Stearic acid | 2 | 2 | 2 | 2 | 2 | 2 |
| Zinc oxide | 1.4 | 1.4 | 1.4 | 1.4 | 1.4 | 1.4 |

TABLE 4-continued

|  | Example | | | | | Com. Ex. |
|---|---|---|---|---|---|---|
|  | 3 | 4 | 5 | 6 | 7 | 2 |
| Sulfur | 2 | 2 | 2 | 2 | 2 | 2 |
| Vulcanization accelerator | 2 | 2 | 2 | 2 | 2 | 2 |
| Results of evaluation | | | | | | |
| Half width at half maximum of tanδ | 15.1 | 15.8 | 19.8 | 22.4 | 14.2 | 63.8 |
| Peak height of tanδ | 0.79 | 0.99 | 1.00 | 0.77 | 1.33 | 0.47 |
| Grip performance | 2 | 4 | 4 | 2 | 5 | 1 |
| Processability (Mooney viscosity) | 62 | 52 | 47 | 75 | 62 | 77 |

INDUSTRIAL APPLICABILITY

The rubber composition for a tire having enhanced uniformity of a temperature dependence curve of a viscoelasticity tan δ can be prepared by using the branched conjugated diene copolymer of the present invention. The branched conjugated diene copolymer is useful for preparing a rubber composition for a tire exhibiting desired performance.

What is claimed is:

1. A branched conjugated diene copolymer composed of monomer components comprising a branched conjugated diene compound represented by a general formula (1):

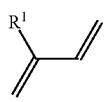
(1)

wherein $R^1$ represents an aliphatic hydrocarbon group having 6 to 11 carbon atoms, and an aromatic vinyl compound represented by a general formula (2):

(2)

wherein $R^2$ represents an aromatic hydrocarbon group having 6 to 10 carbon atoms, and $R^5$ represents a hydrogen atom or an alkyl group having 1 to 3 carbon atoms,
wherein a copolymerization ratio (m) of the aromatic vinyl compound (2) is 45% by mass or more,
wherein the monomer components further comprise a conjugated diene compound represented by a general formula (3):

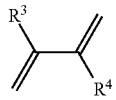
(3)

wherein $R^3$ and $R^4$ are the same or different, and each represents a hydrogen atom, an aliphatic hydrocarbon group having 1 to 3 carbon atoms, or a halogen atom.

2. The branched conjugated diene copolymer of claim 1, having a glass transition temperature of −25° C. or more.

3. The branched conjugated diene copolymer of claim 1, having a glass transition temperature of −10° C. or more.

4. The branched conjugated diene copolymer of claim 1, having a weight-average molecular weight of more than 100000.

5. The branched conjugated diene copolymer of claim 1, wherein a copolymerization ratio (l) of the branched conjugated diene compound (1) is from 1 to 54% by mass, a copolymerization ratio (m) of the aromatic vinyl compound (2) is from 45 to 99% by mass, and a copolymerization ratio (n) of the conjugated diene compound (3) is 54% by mass or less.

6. The branched conjugated diene copolymer of claim 1, wherein the branched conjugated diene compound (1) is myrcene and/or farnesene.

7. The branched conjugated diene copolymer of claim 1, wherein the aromatic vinyl compound (2) is one or more selected from the group consisting of styrene, α-methylstyrene, α-vinylnaphthalene and β-vinylnaphthalene.

8. The branched conjugated diene copolymer of claim 1, wherein the conjugated diene compound (3) is 1,3-butadiene and/or isoprene.

9. A rubber composition comprising the branched conjugated diene copolymer of claim 1 as a rubber component, in which a half width at half maximum of a viscoelasticity tan δ is 40 or less, where the half width at half maximum=(Higher temperature at half height of tan δ peak)−(Tanδ peak temperature).

10. A pneumatic tire produced using the rubber composition of claim 9.

11. The branched conjugated diene copolymer of claim 1, wherein a copolymerization ratio (l) of the branched conjugated diene compound (1) is from 1 to 54% by mass, a copolymerization ratio (m) of the aromatic vinyl compound (2) is from 45 to 99% by mass, and a copolymerization ratio (n) of the conjugated diene compound (3) is in a range of 2 to 54% by mass.

12. The branched conjugated diene copolymer of claim 1, wherein a copolymerization ratio (l) of the branched conjugated diene compound (1) is from 1 to 54% by mass, a copolymerization ratio (m) of the aromatic vinyl compound (2) is from 45 to 99% by mass, and a copolymerization ratio (n) of the conjugated diene compound (3) is 50% by mass or less.

13. A rubber composition, comprising:
a branched conjugated diene copolymer as a rubber component, in which a half width at half maximum of a viscoelasticity tan δ is 40 or less, where the half width at half maximum=(Higher temperature at half height of tan δ peak)−(Tanδ peak temperature),
wherein the branched conjugated diene copolymer is composed of monomer components comprising a branched conjugated diene compound represented by a general formula (1):

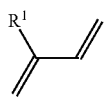
(1)

wherein R¹ represents an aliphatic hydrocarbon group having 6 to 11 carbon atoms, and an aromatic vinyl compound represented by a general formula (2):

(2)

wherein R² represents an aromatic hydrocarbon group having 6 to 10 carbon atoms, and R⁵ represents a hydrogen atom or an alkyl group having 1 to 3 carbon atoms, wherein a copolymerization ratio (m) of the aromatic vinyl compound (2) is 45% by mass or more, wherein the branched conjugated diene copolymer has glass transition temperature of −25° C. or more.

14. The rubber composition of claim 13, wherein the branched conjugated diene copolymer has glass transition temperature of −25° C. or more.

15. The rubber composition of claim 13, wherein the branched conjugated diene copolymer has a glass transition temperature of −10° C. or more.

16. The rubber composition of claim 13, wherein the branched conjugated diene copolymer has a weight-average molecular weight of more than 100000.

17. The rubber composition of claim 13, wherein a copolymerization ratio (l) of the branched conjugated diene compound (1) is from 1 to 54% by mass, and a copolymerization ratio (m) of the aromatic vinyl compound (2) is from 45 to 99% by mass.

18. The rubber composition of claim 13, wherein the branched conjugated diene compound (1) is myrcene and/or farnesene.

19. The rubber composition of claim 13, wherein the aromatic vinyl compound (2) is one or more selected from the group consisting of styrene, α-methylstyrene, α-vinylnaphthalene and β-vinylnaphthalene.

20. A pneumatic tire comprising the rubber composition of claim 13.

21. A pneumatic tire comprising the rubber composition of claim 15.

* * * * *